United States Patent
Simpson et al.

(10) Patent No.: US 11,086,506 B2
(45) Date of Patent: Aug. 10, 2021

(54) METHODS AND SYSTEMS FOR MANAGING DATA AND FILES

(71) Applicant: Icebox, Inc., Los Angeles, CA (US)

(72) Inventors: Matthew Simpson, Los Angeles, CA (US); Ofer Bleiweiss, Beverly Hills, CA (US); Jeremiah Kelman, Los Angeles, CA (US)

(73) Assignee: ICEBOX, INC., Los Angeles, CA (US)

( * ) Notice: Subject to any disclaimer, the term of this patent is extended or adjusted under 35 U.S.C. 154(b) by 0 days.

(21) Appl. No.: 16/828,673

(22) Filed: Mar. 24, 2020

(65) Prior Publication Data

US 2020/0225824 A1     Jul. 16, 2020

Related U.S. Application Data

(63) Continuation-in-part of application No. 15/146,837, filed on May 4, 2016, now abandoned.

(51) Int. Cl.
*G06F 16/16* (2019.01)
*G06F 3/0486* (2013.01)
*G06F 16/21* (2019.01)

(52) U.S. Cl.
CPC ............ *G06F 3/0486* (2013.01); *G06F 16/16* (2019.01); *G06F 16/21* (2019.01)

(58) Field of Classification Search
CPC ...................................................... G06F 3/0486
See application file for complete search history.

(56) References Cited

U.S. PATENT DOCUMENTS

| | | | | |
|---|---|---|---|---|
| 2012/0054674 A1* | 3/2012 | Beykpour | ............. | G06F 3/0481 715/788 |
| 2014/0304599 A1* | 10/2014 | Alexandersson | ..... | G06F 3/0486 715/716 |
| 2015/0019997 A1* | 1/2015 | Kim | ...................... | G06F 3/0488 715/752 |
| 2015/0121281 A1* | 4/2015 | Sihn | ...................... | G06F 3/0488 715/772 |
| 2015/0161717 A1* | 6/2015 | Deleuran Mumm | ........ | G06F 3/04883 705/27.2 |
| 2015/0363062 A1* | 12/2015 | Gunn | .................... | G06F 3/0484 715/784 |

* cited by examiner

*Primary Examiner* — Di Xiao
(74) *Attorney, Agent, or Firm* — Cotman IP Law Group

(57) ABSTRACT

A method and system for data management are presented. A plurality of data objects is generated in a graphical user interface. Each data object includes a lift handle, which may be selected by a user click clicking a mouse, for instance. A cargo is generated and placed in a carrier when the user selects the lift handle using a pointer. While the lift and drop action is pending, each additional selection of a data object by the user via its lift handle is added to the cargo. A graphical representation of the carrier showing the cargo manifest is attached to the pointer. When the user maneuvers the pointer to or over a drop zone, a list of available actions for the cargo in the carrier is presented to the user. A drop action can then be performed on the cargo when the user selects the drop zone.

18 Claims, 5 Drawing Sheets

METHODS AND SYSTEMS FOR MANAGING DATA AND FILES

CROSS REFERENCE TO RELATED APPLICATIONS

The present application is a continuation in part of U.S. patent application Ser. No. 15/146,837, filed on May 4, 2016, specification of which is herein incorporated by reference in its entirety.

BACKGROUND OF THE INVENTION

Field of the Invention

Embodiments of the invention relates to the field of database and file management. More specifically, the invention relates to methods and systems for managing data and files.

Description of the Related Art

One of the traditional method of manipulating data and files in a graphical user interface (GUI) is known as "Drag and Drop". This means that items that needs to be relocated, e.g. files in a file explorer or data in a file editor, etc., are selected and then dragged to a new location. Drag and Drop has a number of limitations and annoyances.

For example, whilst dragging an item the mouse button or trackpad surface must be depressed at all times. This is physically awkward—for example, when using a trackpad the additional pressure creates more friction and has a tendency to result in user errors such as dropping too early or in unintended locations. This is especially an issue when one needs to drag something a long distance or scroll while dragging the item or items.

The requirement for continuous pressure makes Drag and Drop an inherently modal activity, meaning you cannot perform (most) other tasks while the drag and drop operation is in progress. For instance, if one wishes to drag an item to a drop zone on another interface page, and getting to that page requires a click, there is no way to perform the operation. Thus, for drag and drop, the drop zone must be accessible from the drag area without clicking.

Also, the inherently modal nature of drag and drop makes dragging multiple items awkward. The usual interaction is to allow selection of multiple items (sometimes with checkboxes or by pressing a modifier key, e.g. Shift or Ctrl) followed by dragging one of those items. This introduces a disconnect between the selection and dragging phases which arguably makes for a clumsier and less intuitive experience.

In addition, once the user has started the drag operation there is no way to modify the selected items. The user can neither remove nor add items to the payload, and the user has no built-in feedback as to which items have been selected.

These and other drawbacks of drag and drop are addressed by the present invention.

BRIEF SUMMARY OF THE INVENTION

The invention is directed to methods and systems for manipulating data and files. One or more embodiments of the present invention presents a new set of conventions, metaphorically referred to herein as "Lift and Drop", for moving one or more elements in a graphical user interface from one location to another. Lift and Drop is a GUI metaphor intended to provide a more flexible and ergonomic alternative to the commonly used Drag and Drop interaction. Lift and Drop is a general interaction category, and as such makes no assumptions about what is being lifted, what it is being dropped onto, and what will happen once the operation is completed.

In one or embodiments of the present invention, a plurality of data objects is generated in a graphical user interface. Each object may be folder or file in a file explorer, for example. Each data object may also be a highlighted section or portion of text in a text editor; one or more highlighted graphical objects in a file editor or graphical user interface; one or more attachments in an email; one or more users in a group of users; etc. The type of object may depend on the action to be performed. For instance, if it's desired to form a relationship or to break or undo a relationship between two objects, e.g. an attachment to an email, then the object may be a file object.

One or more embodiments of the present invention may be used to move users from one group to another in a file management system; to copy or move documents from one folder to another; to trigger a process, e.g. by dropping an audio file on a play area of a digital music player; for deleting a document, e.g. by dropping into a trash can, etc.

In one or more embodiments, an icon that is representative of the data object is presented to the user. The icon may include a lift handle that is highlighted when selected by a user, e.g. by clicking a mouse button, a trackpad surface, a pointer, etc. The lift handle may be visible at all times in case of a file object, or may be revealed upon right clicking with a mouse, for example. In one or more embodiments the user may be presented with a list of available actions when, for example, the pointer is placed over or hovers around the lift handle.

Once a user performs the selection process on the lift handle, e.g. by clicking with a mouse pointer, the selected item(s) is placed in a cargo and displayed in a cargo carrier. As additional elements are selected by the user, the items are also placed in the cargo and displayed in the cargo carrier. In one or more embodiments, the cargo carrier is presented as a graphical representation attached to the pointer so that the user is continually aware of the impending drop operation.

The carrier presents a cargo manifest comprising all the elements selected by said user. For example, the cargo manifest could be configured to provide a summary of each selected item, the number of items selected, or any other pertinent information needed to show the content of the cargo. The user may unlift, i.e. remove, an item from the cargo by, for example, deselecting the lift handle or pressing a dedicated key. The deselection process may be by clicking on a highlighted lift handle, for example. The user may also want to cancel the entire Lift and Drop operation by clicking on a cancel zone or by pressing a dedicated key, e.g. the escape key.

In one or more embodiments, the user is presented with a list of available drop actions for the cargo when the user moves the pointer to a drop zone. Available drop actions may include cancelling the Lift and Drop operation; moving or copying the items in the cargo to a new location; attaching the items in the cargo to an email or a multi-media player; detaching the items in the cargo from an email; deleting the items in the cargo by placing the pointer over a trash can and clicking the trash can; etc.

In one or more embodiments, the drop zone is highlighted when the pointer is placed over it. A drop zone may be, for instance, a trash can, file folder, email, media player, location in a text file, etc. In one or more embodiments, when the user moves the pointer over the drop zone, the drop zone is highlighted and available actions are listed in a graphical representation. The user may subsequently perform a drop action by clicking on the drop zone.

Lift and Drop improves on the traditional drag and drop model in a number of important ways. For example, by replacing the click-and-hold gesture of drag and drop with single clicks at each stage of the operation, it becomes possible to interweave the selection process with any complex or long-running task.

During a traditional drag and drop operation the usability is crippled by the necessity to maintain pressure, but with Lift and Drop any and all interface interactions can remain available to the user. For example, the user could lift any number of items on one page, then perform a search for another item, deselect an item they realize is not needed, then finally drop all the items in the carrier on one of the returned results.

In one or more embodiments, the Carrier facilitates the Lift and Drop process. For instance, by attaching this interface element to the user's pointer and providing feedback about the current state of the Lift and Drop operation, the user is always aware of the pending drop operation. The Carrier shows a summarized list of the items in the Carrier (i.e. the Manifest) and may also display icon that represents what action would result from dropping onto the zone currently underneath the pointer (the Drop Action).

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

Figure 1:
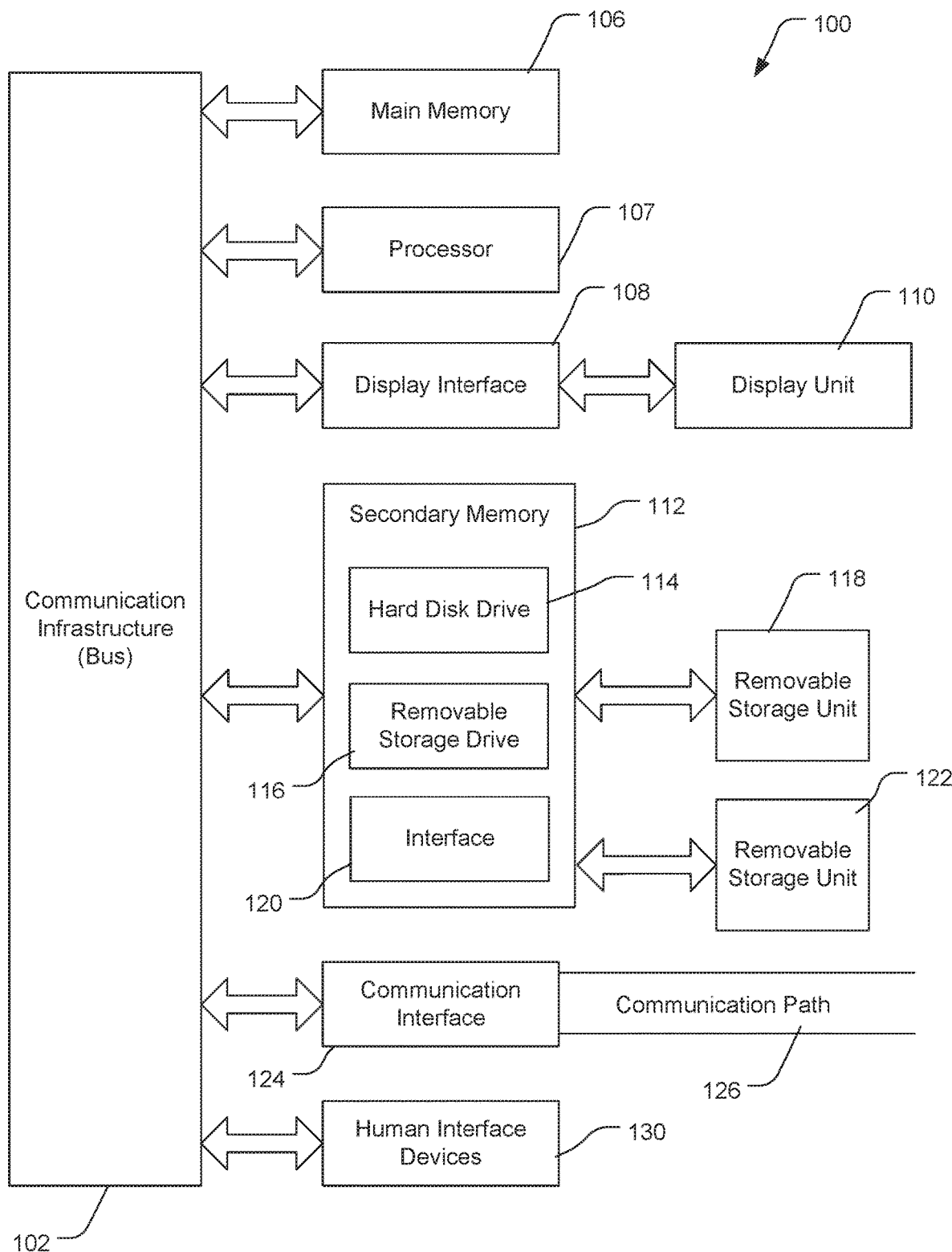
FIG. 1 illustrates a general-purpose computer and peripherals that when programmed as described herein may operate as a specially programmed computer capable of implementing one or more methods and systems of the present invention.

The present invention comprising methods and systems for data management will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

For a better understanding of the disclosed embodiment, the following terms are used throughout this specification. The definitions provided below are not intended to be limiting but are presented as an aid to facilitate description and understanding of the invention.

"Lift" refers to the process of selecting an item to be put into the Carrier by clicking on its Lift Handle.

"Drop" refers to the process of performing a Drop Action with the lifted Cargo by clicking on a Drop Zone.

"Drop Action" is the specific action or process which is performed when dropping the Cargo onto a Drop Zone. Examples of drop actions include cancelling, moving, copying, attaching, detaching, merging, appending, prepending, ordering, linking, assigning, associating, inviting, deleting etc.

"Cancel" is the process of abandoning the impending Lift and Drop operation, e.g., by clicking on a Cancel Zone or pressing the escape key.

"Unlift" is the process of removing a lifted item from the Carrier by clicking the same Lift Handle that was used to lift the item originally.

The "Carrier" is a graphical interface element attached to the user's pointer which displays the Manifest and the currently available Drop Action(s). The Carrier may be attached to the pointer throughout the Lift and Drop operation, for example, or may be strategically placed somewhere on the graphical user interface.

"Cargo" is the currently lifted item(s) in the Carrier.

"Manifest" is a displayed list or summary of the Cargo which is in the Carrier.

The "Lift Handle" is an interface element on an item which may be clicked to lift that item. The Lift Handle could be an icon attached to a data object; a selection in a drop down list of items when a user right clicks on the data object; the Lift Handle could be hidden and only revealed when the user highlights the object; etc. The Lift Handle is preferably highlighted if the item is selected.

"Drop Zone" is the interface element on an area which may be clicked to drop lifted items on that area. The Drop Zone is preferably highlighted when the Carrier is over it.

"Cancel Zone" is an interface area which may be selected, e.g. clicked, to Cancel a Lift and Drop operation. Typically, this would be the background of the interface.

One or more embodiments of the present invention will now be described with references to FIGS. 1-9.

FIG. 1 diagrams a general-purpose computer and peripherals, when programmed as described herein, may operate as a specially programmed computer capable of implementing one or more methods, apparatus and/or systems of the solution described in this disclosure. Processor 107 may be coupled to bi-directional communication infrastructure 102 such as communication infrastructure system bus 102. Communication infrastructure 102 may generally be a system bus that provides an interface to the other components in the general-purpose computer system such as processor 107, main memory 106, display interface 108, secondary memory 112 and/or communication interface 124.

Main memory 106 may provide a computer readable medium for accessing and executed stored data and applications. Display interface 108 may communicate with display unit 110 that may be utilized to display outputs to the user of the specially-programmed computer system. Display unit 110 may comprise one or more monitors that may visually depict aspects of the computer program to the user. Main memory 106 and display interface 108 may be coupled to communication infrastructure 102, which may serve as the interface point to secondary memory 112 and communication interface 124. Secondary memory 112 may provide additional memory resources beyond main memory 106, and may generally function as a storage location for computer programs to be executed by processor 107. Either fixed or removable computer-readable media may serve as Secondary memory 112. Secondary memory 112 may comprise, for example, hard disk 114 and removable storage drive 116 that may have an associated removable storage unit 118. There may be multiple sources of secondary memory 112 and systems implementing the solutions described in this disclosure may be configured as needed to support the data storage requirements of the user and the methods described herein. Secondary memory 112 may also comprise interface 120 that serves as an interface point to additional storage such as removable storage unit 122. Numerous types of data storage devices may serve as repositories for data utilized by the specially programmed computer system. For example, magnetic, optical or magnetic-optical storage systems, or any other available mass storage technology that provides a repository for digital information may be used.

Communication interface 124 may be coupled to communication infrastructure 102 and may serve as a conduit for data destined for or received from communication path 126. A network interface card (NIC) is an example of the type of device that once coupled to communication infrastructure 102 may provide a mechanism for transporting data to communication path 126. Computer networks such Local Area Networks (LAN), Wide Area Networks (WAN), Wireless networks, optical networks, distributed networks, the Internet or any combination thereof are some examples of the type of communication paths that may be utilized by the specially program computer system. Communication path 126 may comprise any type of telecommunication network or interconnection fabric that can transport data to and from communication interface 124.

To facilitate user interaction with the specially programmed computer system, one or more human interface devices (HID) 130 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to processor 107 to trigger one or more responses from the specially programmed computer are within the scope of the system disclosed herein.

While FIG. 1 depicts a physical device, e.g. a computer, a tablet, a smartphone, etc. The scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resource are made available on demand over the Internet or any other network. In one or more embodiments, the system may also encompass parallel systems, multi-processor systems, multi-core processors, and/or any combination thereof. Where a virtual machine, process, device or otherwise performs substantially similarly to that of a physical computer system, such a virtual platform will also fall within the scope of disclosure provided herein, notwithstanding the description herein of a physical system such as that in FIG. 1.

In one or embodiments of the present invention comprises a plurality of data objects is generated in a graphical user interface. Each data object is a distinct object in a graphical user interface. For instance, each data object may be folder, a graphical object, a file or group of files in a file explorer, for example. Each data object may also be identified by highlighting a section or portion of text in a text editor; one or more graphical objects in a file editor or graphical user interface; one or more attachments to an email; one or more users in a group of users; etc. The type of object may depend on the action to be performed. For instance, if it's desired to form a relationship or to break or undo a relationship between two objects, e.g. an attachment to an email, then the object may be a file object.

In document management systems, embodiments of the present invention may be used to move one or more documents from one family to another; to move families from one cluster to another; to move users, e.g. players, from one group to another, etc. For these and other types of relationships and data objects, see for example, pending U.S. patent application Ser. No. 14/296,287, filed on Jun. 4, 2014, entitled "COLLABORATIVE MATTER MANAGEMENT AND ANALYSIS", specification of which is herein incorporated by reference.

One or more embodiments of the present invention may be used to copy or move documents from one folder to another; to trigger a process, e.g. by dropping an audio or video file on a play area of a media player; for deleting a document, e.g. by dropping into a trash can, etc.

Figure 2:
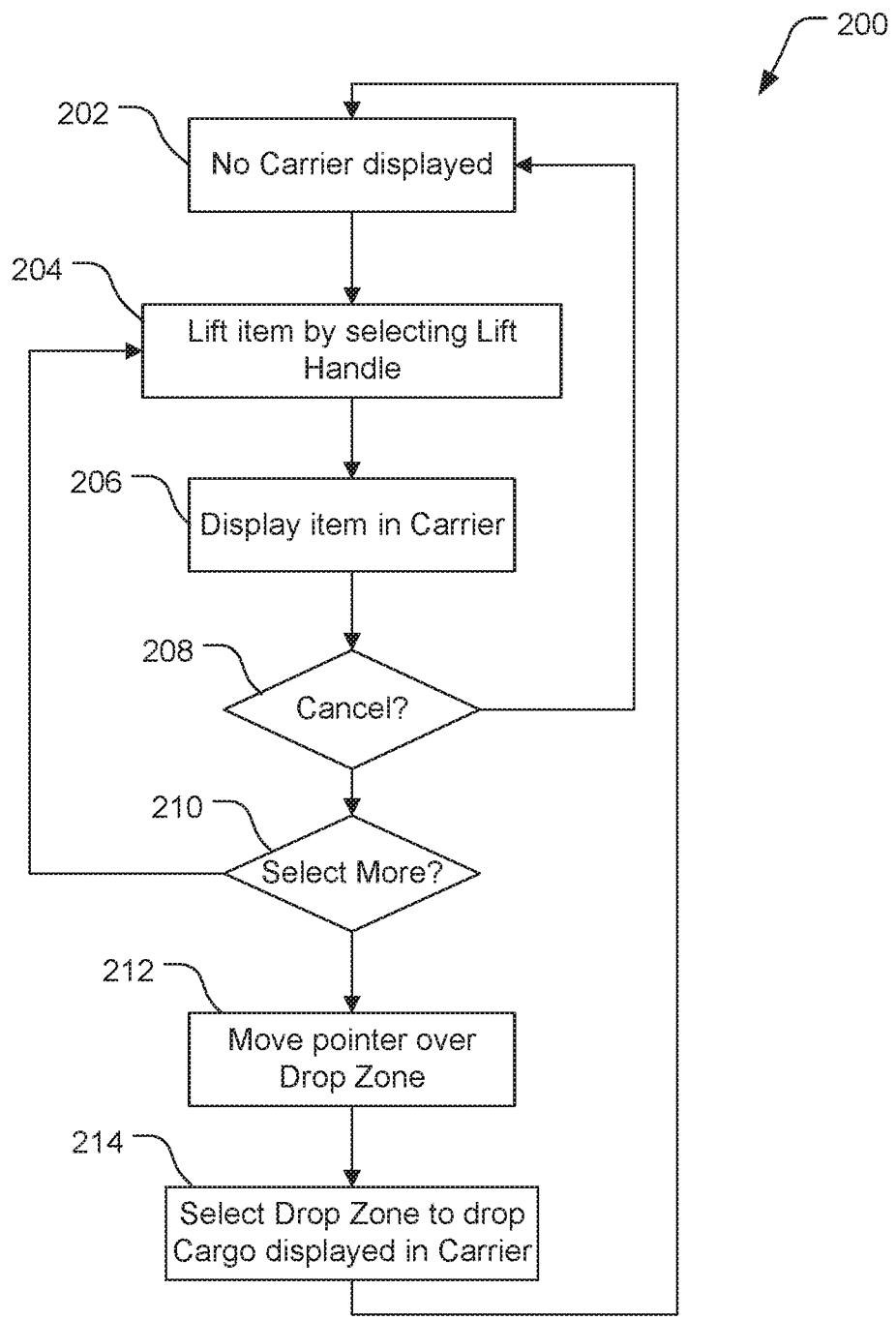
FIG. 2 is a flowchart illustrating the lift and drop process in accordance with one or more embodiments of the present invention.

FIG. 2 is a flowchart illustrating the Lift and Drop process 200 in accordance with one or more embodiments of the present invention. As illustrated, the process begins in block 202 with no Carrier displayed since there is no Cargo in the Carrier. In a preferred embodiment a Carrier is only displayed and attached with the pointer when there is lifted Cargo.

Figure 3:
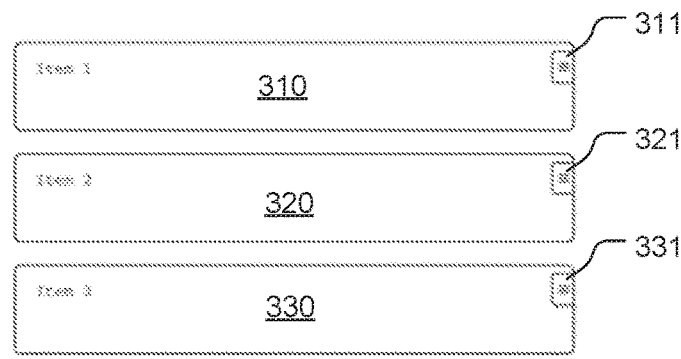
FIG. 3 is an illustration of exemplary data objects and associated lift handles in accordance with one or more embodiments of the present invention.

In one or more embodiments, an icon that is representative of the data object is presented to the user. For instance, as illustrated in FIG. 3, icon 310 is presented for data object "Item 1"; icon 320 is presented for data object "Item 2"; and icon 330 is presented for data object "Item 3". Icon 310 includes Lift Handle 311, icon 320 includes Lift Handle 321, and icon 330 includes Lift Handle 331. Those of skill in the arts would appreciate that the Lift Handle may be readily visible at all times in case of a file object, as illustrated, or may be hidden to be revealed upon some action by the user, e.g. by right clicking on a mouse.

Figure 4:
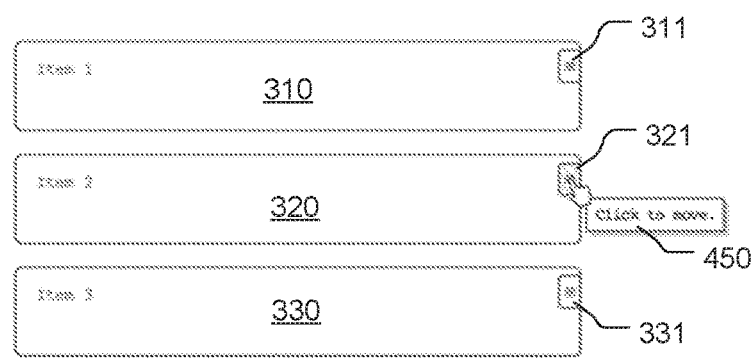
FIG. 4 is an illustration of the icon showing available actions when a pointer is placed over the lift handle of a data object in accordance with one or more embodiments of the present invention.

In one or more embodiments the user may be presented with an icon, e.g. 450, comprising a list of available actions when, for example, the pointer is placed over or hovers around the lift handle, as illustrated in FIG. 4. In this illustrative example, the available option for "Item 2", i.e. data object 320, is to move thus icon 450 displays the message "Click to move".

Figure 5:
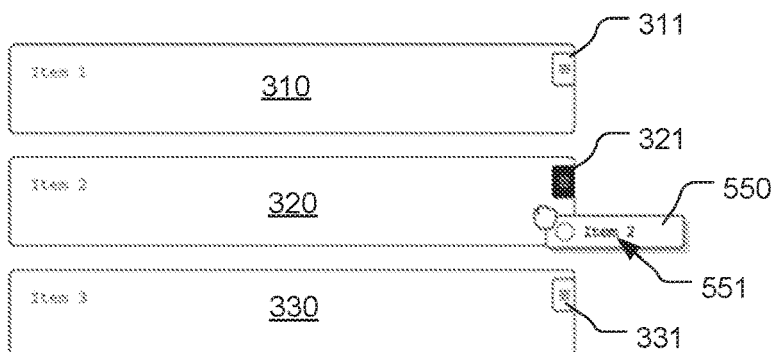
FIG. 5 is an illustration of a selected a lift handle of a data object and the Carrier icon in accordance with one or more embodiments of the present invention.

Referring back to FIG. 2, in block 204, the user would lift the desired item by clicking on its Lift Handle, e.g. 321. The Lift Handle icon, e.g. 321, is preferably highlighted when selected by a user, e.g. by clicking a mouse button, a trackpad surface, a pointer, etc., as illustrated in FIG. 5. In block 206, the selected item is displayed in the Carrier, e.g. 550. A summary of the item in the Carrier, i.e. "Item 2", is displayed in the manifest 551.

Figure 6:
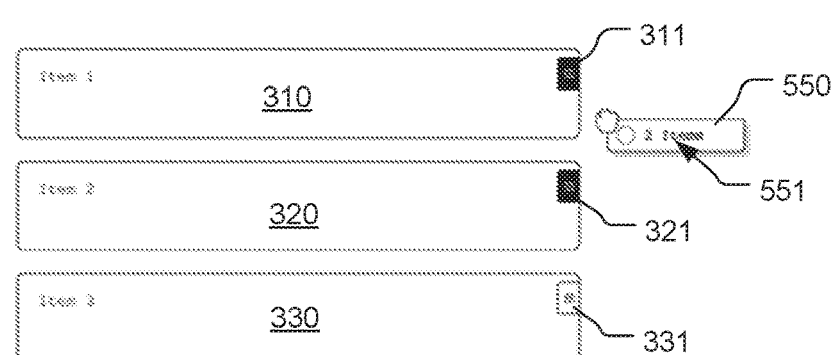
FIG. 6 is an illustration of selection of multiple lift handles and the Carrier icon in accordance with one or more embodiments of the present invention.

As illustrated in FIG. 6, additional items may be selected and added to the Cargo by the user. For example, "Item 1", i.e. data object 310, may be selected by clicking on Lift Handle 311, which is then highlighted to illustrate its selection. The newly selected item is then added to the Cargo and displayed on the Carrier 550. The manifest 551 is updated to show a summary of all the items in the Carrier. The summary may take several different forms, e.g. the number of items in the Carrier, as illustrated in FIG. 6; a brief description of each item in the Carrier (not shown), etc.

Figure 10:
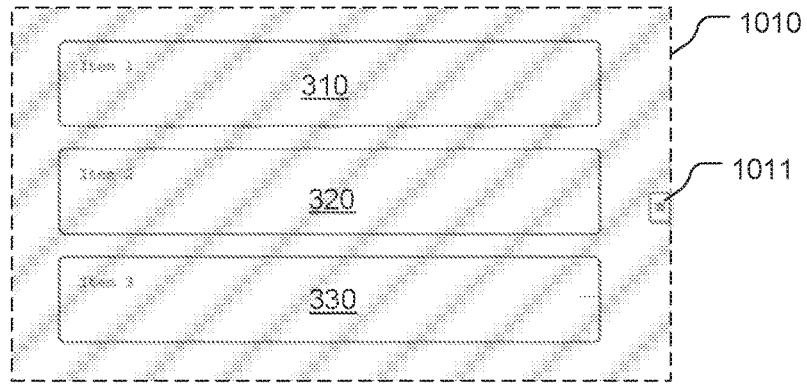
FIG. 10 is an illustration of an exemplary grouping of items to create a data object with a lift handle in accordance with one or more embodiments of the present invention.

In one embodiment, a user editing a dataset or file, may highlight a group of items, e.g. folders, graphical objects, etc. when desired to perform a lift and drop operation in accordance with the invention. FIG. 10 is an illustration of an exemplary grouping of items to create a data object with a lift handle in accordance with one or more embodiments of the present invention. As illustrated, a group of items, e.g. 310, 320, and 330, are highlighted using a suitable method provided by the graphical user interface, e.g. by capturing items in a selected rectangular area to create data object 1010. In the illustrated example, when items 310, 320, and 330 are highlighted, a lift handle 1011 may appear next to data object 1010 or be hidden to be revealed upon right clicking, for instance. Lift handle 1011 operates just like any other lift handle of the present invention. Once the lift handle is selected, the data object 1010, i.e. objects 310-330, remains highlighted as a payload (or cargo element). The user may then repeat the above steps for additional data objects to be lifted.

Figure 11:
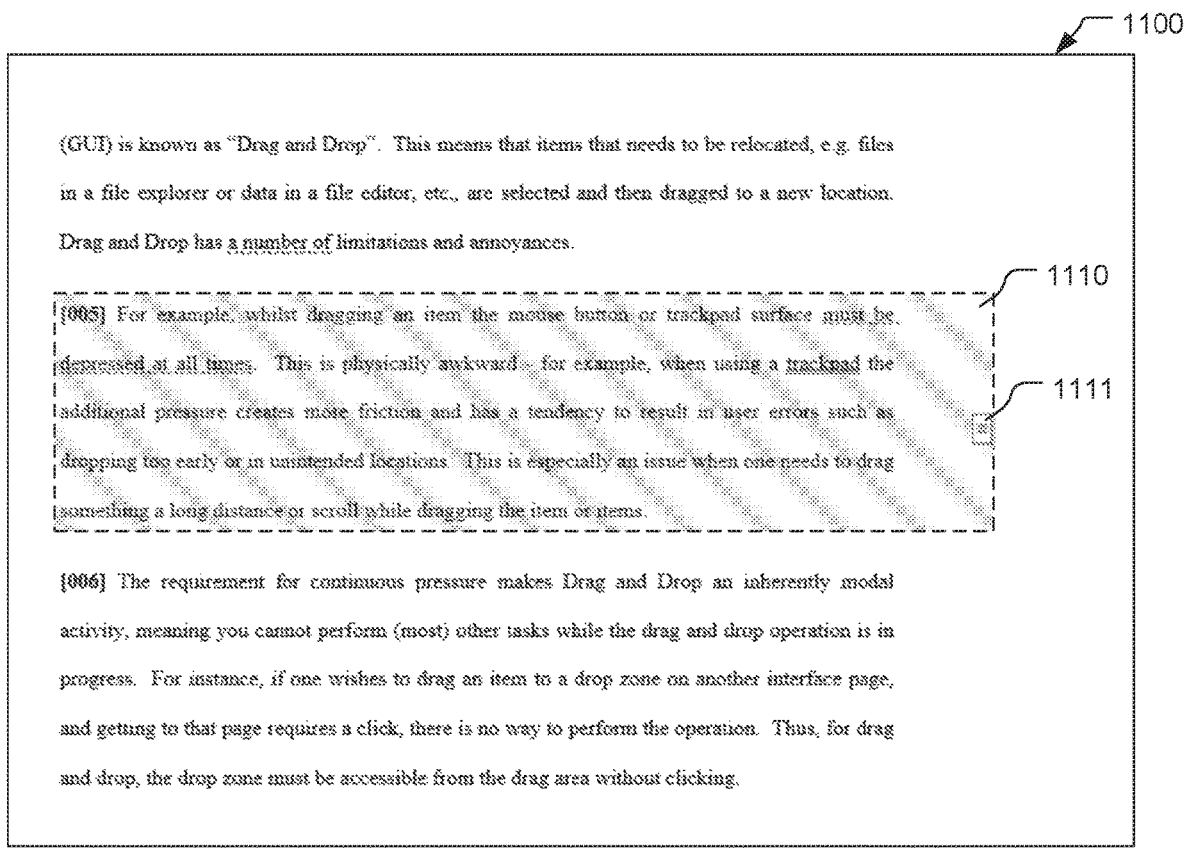
FIG. 11 is an illustration of an exemplary selection of text in a text editor to create a data object with a lift handle in accordance with one or more embodiments of the present invention.

In one embodiment, a user editing a dataset or file, may highlight a portion of the dataset or file content as a selection. FIG. 11 is an illustration of an exemplary selection of text to create a data object 1110 in a text editor 1100 to create a lift handle in accordance with one or more embodiments of the present invention. The highlighted text block becomes data object 1110, resulting in a lift handle 1111 for the data object. The lift handle may appear next to the highlighted text block, i.e. data object 1110, or be hidden to be revealed upon right clicking, for instance. Those of skill in the art may appreciate that other methods of exposing the lift handle is possible, for instance, the lift handle may be exposed by right clicking the mouse or trackpad on the selection. The user may then select (e.g. left click) the lift handle to lift the selected object. Once the lift handle is selected, the highlighted section remains highlighted as a payload (or cargo element). The user may then repeat the above steps for additional portions of the dataset or file to be lifted.

While the Lift and Drop operation is pending, the user may perform other functions. For example, any and all interface interactions remains available to the user during Lift and Drop. For example, the user could lift any number of items on one page, then perform a search for another item, deselect an item they realize is not needed, then finally drop all the items on one of the returned results.

In one or more embodiments, the Carrier facilitates the Lift and Drop process. For instance, by attaching this interface element to the user's pointer and providing feedback about the current state of the Lift and Drop operation, the user is always aware of the pending drop operation. The Carrier 550 provides a summary of the items in the Carrier in the Manifest 551.

Once a user performs the selection process on the lift handle, e.g. by clicking with a mouse pointer, the selected item is placed in a cargo and displayed in the cargo carrier. As additional elements are selected by the user, the items are also placed in the cargo and displayed in the cargo carrier. In one or more embodiments, the cargo carrier is presented as a graphical representation on the pointer so that the user is continually aware of the impending drop operation. The carrier presents a cargo manifest comprising all the elements selected by said user. For example, the cargo manifest could be configured to provide a summary of each selected item, the number of items selected, or any other pertinent information needed to show the content of the cargo. The user may unlift, i.e. remove, an item from the cargo by deselecting the lift handle. The deselection process may be by clicking on a highlighted lift handle, for example. The user may also want to cancel the entire Lift and Drop operation by clicking on a cancel zone or by pressing a dedicated key, e.g. the escape key.

Referring back to FIG. 2, in block 208, the user can cancel a drop operation or unlift an item that is currently in the Carrier. Upon cancellation of the Lift and Drop operation, the Carrier is no longer displayed, block 202. However, if the user continues with the interaction and the Lift and Drop operation, and wants to select additional items in block 210, the process returns to block 204 for the selection. Otherwise, the process proceeds to block 212.

In one or more embodiments, the user is presented with a list of available drop actions for the cargo when the user moves the pointer to a drop zone at block 212. Available drop actions may include cancelling the Lift and Drop operation; moving or copying the items in the cargo to a new location; attaching the items in the cargo to an email or a multi-media player; detaching the items in the cargo from an email; deleting the items in the cargo by placing the pointer over a trash can and clicking the trash can; etc.

In one or more embodiments, the drop zone is highlighted when the pointer is placed over it. A drop zone may be, for instance, a trash can, file folder, email, media player, location in a text file, etc. In one or more embodiments, when the user moves the pointer over the drop zone, the drop zone may be highlighted and available actions are listed in a graphical representation. The user may subsequently perform a drop action by clicking on the drop zone.

Figure 7:
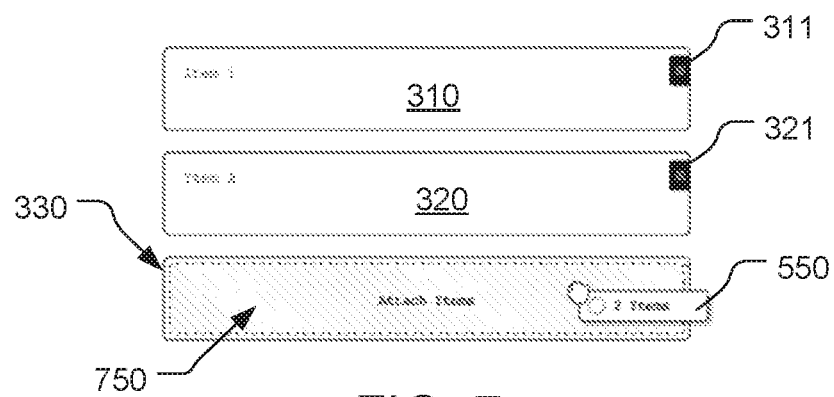
FIG. 7 is an illustration of an exemplary drop zone for attaching lifted items onto another data object in accordance with one or more embodiments of the present invention.

In block 212, the user moves the pointer to the drop zone and an icon, e.g. 750, that represents what action(s) would result from dropping onto the zone currently underneath the pointer (the Drop Action), is displayed to the user. In the illustration of FIG. 7, the pointer is moved over "Item 3", i.e. data object 330. In this case, the only available action is to attach the items in Carrier 550 onto data object 330, thus the message on the drop zone 750 is "Attach Items".

Figure 8:
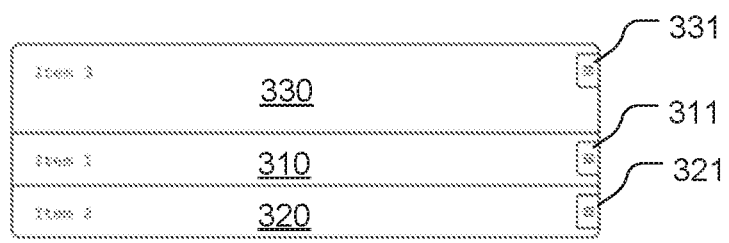
FIG. 8 is an illustration of the exemplary data objects after the lifted items have been attached onto another data object in accordance with one or more embodiments of the present invention.
Figure 9:
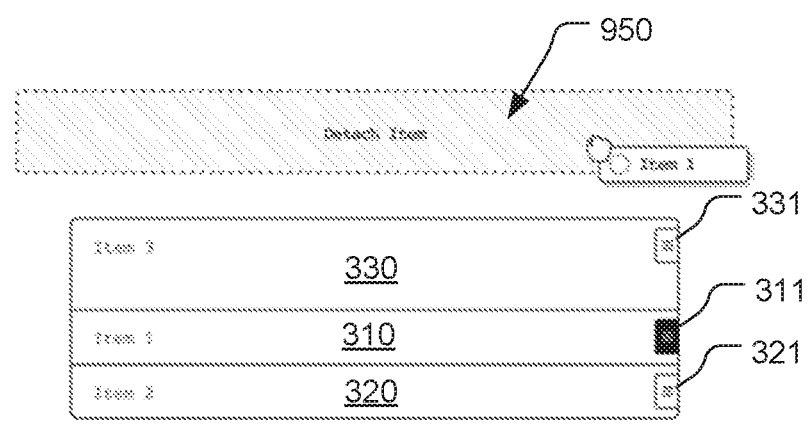
FIG. 9 is an illustration of an exemplary drop zone for detaching a lifted item in accordance with one or more embodiments of the present invention.

At block 214, the user selects the drop zone to drop the cargo in the carrier. Upon selecting the drop zone, e.g. by clicking, the Cargo, i.e. items in the Carrier 550, is attached to drop zone. This is illustrated in FIG. 8, which shows data object 310 and data object 320 attached to data object 330.

A user may also detach an item that is attached to a data object by selecting the item's Lift Handle and then clicking on the detach zone. For instance, as illustrated in in FIG. 9, "Item 1" and "Item 2" (i.e. data objects 310 and 320) are attached to data object 330. The user selects lift handle 311 of data object 310. The selection is indicated by the highlighted lift handle 310. The user then moves the pointer to a detach zone, e.g. an empty folder area, where the only available action is to detach the item in Carrier 550, which is "Item 1", thus the available action displayed on the drop zone 950 is "Detach Item". The user may then detach the item in the Carrier 550 by selecting the drop zone.

In one or more embodiments, the Drop Zone could be selected prior to generation of the Cargo by the user. For instance, the user could preselect the Drop Zone and desired Drop Action, then proceed to generation of the Cargo and once the Cargo generation is complete, the Drop Action would automatically occur or based on some predefined action or key.

While the invention herein disclosed has been described by means of specific embodiments and applications thereof, numerous modifications and variations could be made thereto by those skilled in the art without departing from the scope of the invention set forth in the claims.

What is claimed is:

1. A method for manipulating data objects in a user interface comprising:
   presenting one or more data objects in a graphical user interface, each one of said one or more data objects having a lift handle that is always visible,
      wherein said one or more data objects comprise single items in said graphical user interface, and
      wherein said one or more data objects comprise highlighted group of items in said graphical user interface;
   presenting a list of one or more available actions for a data object when a user moves a pointer over the lift handle of said data object prior to selection of the data object, wherein said list of one or more available actions is only available on a first data object to be selected by said user, and wherein selection of an action from said one or more available actions is a selection of the first data object for said action;
   obtaining a cargo comprising one or more elements, wherein each one of said one or more elements is a representation of a data object based on selections by said user from said one or more data objects,
      wherein a first one of said one or more cargo elements is obtained when said user selects one of said one or more available actions from the lift handle of said first data object to be selected, and
      wherein a subsequent one of said one or more cargo elements is obtained when said user selects the lift handle of unselected ones of said one or more data objects;
   presenting a graphical representation of a carrier, said carrier configured to show a cargo manifest comprising information on said one or more elements of said cargo; and
   performing a drop action on said cargo when said user moves said pointer to a drop zone and selects said drop zone, wherein said drop action is based on said selected one of said one or more available actions.

2. The method of claim 1, wherein said drop action comprises one of cancelling, moving, copying, attaching, detaching, merging, appending, prepending, ordering, linking, assigning, associating, inviting, and deleting.

3. The method of claim 1, wherein at least one of said one or more data objects is a file object.

4. The method of claim 1, wherein at least one of said one or more data objects is a highlighted portion in a data file.

5. The method of claim 1, wherein said lift handle is an icon attached to a data object.

6. The method of claim 1, wherein said lift handle is highlighted when selected by said user.

7. The method of claim 1, wherein said drop zone is highlighted when said pointer is placed over said drop zone.

8. A system for manipulating data objects on a user interface comprising:
   a processor and a memory with instructions to:
      present one or more data objects in a graphical user interface, each one of said one or more data objects having a lift handle that is always visible, wherein said one or more data objects comprise single items in said graphical user interface, and wherein said one or more data objects comprise highlighted group of items in said graphical user interface:
      present a list of one or more available actions for a data object when a user moves a pointer over the lift handle of said data object prior to selection of the data object, wherein said list of one or more available actions is only available on a first data object to be selected by said user and wherein selection of an action from said one or more available actions is a selection of the first data object for said action
      obtain a cargo comprising one or more elements, wherein each one of said one or more elements is a representation of a data object based on selections by said user from said one or more data objects,
         wherein a first one of said one or more cargo elements is obtained when said user selects one of said one or more available actions from the lift handle of said first data object to be selected, and wherein a subsequent one of said one or more cargo elements is obtained when said user selects the lift handle of unselected ones of said one or more data objects;

present a graphical representation of a carrier, said carrier configured to show a cargo manifest comprising information on said one or more elements of said cargo; and performing a drop action on said cargo when said user moves said pointer to a drop zone and selects said drop zone, wherein said drop action is based on said selected one of said one or more available actions.

9. The system of claim 8, wherein said drop action comprises one of cancelling, moving, copying, attaching, detaching, merging, appending, prepending, ordering, linking, assigning, associating, inviting, and deleting.

10. The system of claim 8, wherein at least one of said plurality of data objects is a file object.

11. The system of claim 8, wherein at least one of said plurality of data objects is a highlighted portion in a data file.

12. The system of claim 8, wherein said lift handle is a selection in a graphical representation.

13. The system of claim 8, wherein said lift handle is highlighted when selected by said user.

14. The system of claim 8, wherein said drop zone is highlighted when said pointer is placed over said drop zone.

15. A non-transitory computer-readable medium comprising computer-readable instructions for manipulating data objects on a user interface, wherein execution of said computer-readable instructions by one or more processors causes said one or more processors to:
　present one or more data objects in a graphical user interface, each one of said one or more data objects having a lift handle that is always visible,
　　wherein said one more data objects comprises single items in said graphical user interface, and
　　wherein said one more data objects comprises single items highlighted group of items in said graphical user interface;
　present a list of one or more available actions for a data object when a user moves a pointer over the lift handle of said data object prior to selection of the data object, wherein said list of one or more available actions is only available on a first data object to be selected by said user, and wherein selection of an action from said one or more available actions is a selection of the first data object for said action;
　obtain a cargo comprising one or more elements, wherein each one of said one or more elements is a representation of a data object based on selections by said user from said one or more data objects,
　　wherein a first one of said one or more cargo elements is obtained when said user selects one of said one or more available actions from the lift handle of said first data object to be selected, and
　　wherein a subsequent one of said one or more cargo elements is obtained when said user selects the lift handle of unselected ones of said one or more data objects;
　present a graphical representation of a carrier, wherein said carrier is attached to said pointer, wherein said carrier is configured to show a cargo manifest comprising information on said cargo; and
　perform a drop action on said cargo when said user moves said pointer to a drop zone and selects said drop zone, wherein said drop action is based on said selected one of said one or more available actions.

16. The non-transitory computer-readable medium of claim 15, wherein said drop action comprises one of cancelling, moving, copying, attaching, detaching, merging, appending, prepending, ordering, linking, assigning, associating, inviting, and deleting.

17. The non-transitory computer-readable medium of claim 15, wherein at least one of said one or more data objects is a highlighted portion in a data file.

18. The non-transitory computer-readable medium of claim 15, wherein said lift handle is highlighted when selected by said user.

* * * * *